United States Patent
Zhang (10) Patent No.: US 10,246,332 B2
(45) Date of Patent: Apr. 2, 2019

(54) POLYMERIC MICROPARTICLES AS FILTRATION AND/OR CLARIFYING AIDS IN PHOSPHORIC ACID PRODUCTION

(71) Applicant: Cytec Industries Inc., Princeton, NJ (US)

(72) Inventor: Lei Zhang, Stamford, CT (US)

(73) Assignee: Cytec Industries Inc., Princeton, NJ (US)

( * ) Notice: Subject to any disclaimer, the term of this patent is extended or adjusted under 35 U.S.C. 154(b) by 0 days.

(21) Appl. No.: 15/254,617

(22) Filed: Sep. 1, 2016

(65) Prior Publication Data

US 2017/0057822 A1    Mar. 2, 2017

Related U.S. Application Data

(60) Provisional application No. 62/212,835, filed on Sep. 1, 2015.

(51) Int. Cl.

| C01B 25/20 | (2006.01) |
|---|---|
| C08F 20/00 | (2006.01) |
| C01B 25/235 | (2006.01) |
| C01B 25/222 | (2006.01) |
| C08F 20/06 | (2006.01) |
| C08F 20/56 | (2006.01) |
| C02F 1/56 | (2006.01) |
| C01F 11/46 | (2006.01) |
| C02F 1/00 | (2006.01) |
| B01D 21/01 | (2006.01) |
| C02F 101/10 | (2006.01) |
| C02F 103/34 | (2006.01) |

(52) U.S. Cl.
CPC .......... *C01B 25/235* (2013.01); *C01B 25/222* (2013.01); *C01F 11/46* (2013.01); *C02F 1/001* (2013.01); *C02F 1/56* (2013.01); *C08F 20/06* (2013.01); *C08F 20/56* (2013.01); *B01D 21/01* (2013.01); *C02F 2101/105* (2013.01); *C02F 2103/34* (2013.01); *C08F 2800/20* (2013.01); *C08F 2810/20* (2013.01)

(58) Field of Classification Search
CPC ...... B01D 21/01; C01B 25/222–25/235; C01F 1/00; C02F 1/56
See application file for complete search history.

(56) References Cited

U.S. PATENT DOCUMENTS 3,480,853 A    11/1969 Ban
3,644,091 A    2/1972 Naschke et al.
(Continued)

OTHER PUBLICATIONS

International Search Report of PCT/US2016/049926; dated Nov. 29, 2016.
Written Opinion of PCT/US2016/049926; dated Nov. 29, 2016.

*Primary Examiner* — Colleen P Dunn
(74) *Attorney, Agent, or Firm* — Charles E. Bell, Esq.; Elizabeth A. Galletta, Esq.

(57) ABSTRACT

Processes for enhancing filtration rate and/or clarification of phosphoric acid produced by the wet process and containing suspended insoluble particulates by adding to one or more stage of the wet process phosphoric acid production stream an effective amount of a reagent including polymeric microparticles characterized as being anionic or amphoteric and having a weight average molecular weight of greater than 60 Million daltons are provided herein.

19 Claims, 1 Drawing Sheet

(56) References Cited

U.S. PATENT DOCUMENTS

| | | | |
|---|---|---|---|
| 4,263,148 A | | 4/1981 | Symens et al. |
| 4,291,005 A | | 9/1981 | Poulos et al. |
| 4,402,920 A | | 9/1983 | Lopez et al. |
| 4,569,768 A | | 2/1986 | McKinley |
| 4,800,071 A | | 1/1989 | Kaesler et al. |
| 4,968,435 A | | 11/1990 | Neff et al. |
| 5,009,873 A | | 4/1991 | Kerr et al. |
| 5,171,808 A | | 12/1992 | Ryles et al. |
| 5,173,280 A | | 12/1992 | Rey et al. |
| 5,185,135 A | * | 2/1993 | Pillai ..................... B01D 37/02 423/320 |
| 5,211,928 A | | 5/1993 | Rey et al. |
| 5,286,806 A | | 2/1994 | Neff et al. |
| 5,318,707 A | | 6/1994 | Rey et al. |
| 5,380,444 A | | 1/1995 | Ryan et al. |
| 6,130,303 A | * | 10/2000 | Neff ......................... C02F 1/56 428/402 |
| 7,563,378 B2 | | 7/2009 | Irwin |
| 2012/0171099 A1 | | 7/2012 | Davis |

\* cited by examiner

POLYMERIC MICROPARTICLES AS FILTRATION AND/OR CLARIFYING AIDS IN PHOSPHORIC ACID PRODUCTION

CROSS-REFERENCE TO RELATED APPLICATIONS

This application claims benefit of priority from U.S. Provisional Application No. 62/212,835 filed on Sep. 1, 2015 the content of which is incorporated herein by reference in its entirety.

BACKGROUND OF THE INVENTION

1. Field of the Invention

The present invention generally relates to the technical field of wet process phosphoric acid. More particularly, the invention relates to the use of filtration and/or clarifying aids to enhance the filtration rate and/or clarity of phosphoric acid slurries produced by the wet process (WPA).

2. Description of the Related Art

The manufacture of phosphoric acid is well known and is the subject of numerous textbooks. An overall view of the manufacture of phosphates and phosphoric acid is treated by Becker in *Phosphates and Phosphoric Acids*, Marcel Dekker, Inc. 1989; and by Stack in *Phosphoric Acid, Part 1 and Part 2*, Marcel Dekker, Inc. 1968.

About 90% of the world's phosphoric acid is produced according to the wet process, which is conventionally prepared by acidulating phosphate rock (which contains calcium phosphate) with sulfuric acid to yield a crude, wet-process phosphoric acid (WPA) containing calcium sulfate and/or fluorosilicates as insoluble waste precipitates (gypsum). These insoluble particles are removed by filtration and/or clarification processes prior to concentration and recovery of the acid. Additional solids are generated during concentration of the acid and can be removed via the clarifiers. Each concentration step typically produces more precipitate contaminants.

The wet process phosphoric acid production process is a commercially important process, with the phosphoric acid produced thereby being an important raw material for the manufacture of phosphates for the fertilizer industry. Efficient filtration of crude phosphoric acid from suspended solids after digestion of the ores, as well as efficient clarification of phosphoric acid at various stages, is critical to maintain production. If a plant is limited by filtration capacity, improvement of filtration efficiency can have a huge commercial impact by increasing production without the need for capital investment. For this reason there has been much effort in the prior art to improve the filtration rate of the phosphoric acid with the use of filtration and/or clarifying aids.

For example, as noted in U.S. Pat. No. 4,291,005 to Poulos et al. (1981) and U.S. Pat. No. 4,800,071 to Kaesler et al. (1989), conventional organic flocculants have been applied to agglomerate fine particulate solids to clarify phosphoric acid and to improve filtration rate. The '005 patent discloses methods of settling suspended solids in phosphoric acid product solutions using acrylamide/acrylate polymers. The polymers disclosed consist essentially of a predominant proportion of acrylic acid or acrylate units (~95 mol %) and a minor portion of acrylamide units (~5 mol %). The '071 patent discloses sulfonated acrylamide and sulfonated acrylamide/acrylate polymers for aiding filtration in wet process phosphoric acid production.

U.S. Pat. No. 3,644,091 to Naschke et al. (1972) discloses methods for clarifying phosphoric acid using water soluble sulfonated polystyrenes having molecular weights from about 1 to about 40 million.

Several patents to Rey et al. (U.S. Pat. No. 5,173,280 (1992), U.S. Pat. No. 5,211,928 (1993), and U.S. Pat. No. 5,318,707 (1994)) disclose processes for clarifying phosphoric acid or for improving the filtration of phosphoric acid using high molecular weight acrylamide/acrylamido methylpropyl sulfonic acid-type polymers or carboxylic-type polymer having a portion of sulfonic functionality.

However, while the various reagents discussed above may have applicability, and even some merits, in wet process phosphoric acid production, the filtration part of the process still frequently becomes a bottleneck nowadays when either the filter cloth develops fluorosilicate-type scale (which requires cleaning), and/or when the gypsum particles' size and morphology do not allow for efficient filtration.

Frequently, phosphoric acid plants have to shut down to physically clean the scale or replace the filter cloth after less than a week's worth of operating time. The economic impact for the filtration-related issues is substantial, and the industry is in need of a more efficient filtration and/or clarifying aid technology than the existing ones. Since many factors (e.g., solid species, particulate size and distribution, particulate morphologies and ionic strength, concentration, and viscosity of phosphoric acid medium) can affect the performance of such filtration and/or clarifying aids, it is a great challenge to develop high-efficiency aids useful for clarifying phosphoric acid and/or enhancing the filtration rate.

Accordingly, processes that employ high-efficiency filtration and/or clarifying aids to effectively enhance the filtration rate and/or clarity of phosphoric acid would be a useful advance in the art and could find rapid acceptance in the industry.

SUMMARY OF THE INVENTION

The forgoing and additional objects are attained in accordance with the principles of the invention wherein it is now disclosed that certain polymeric microparticles are effective filtration and/or clarifying aids for enhancing the filtration rate and/or improving the clarity of phosphoric acid slurry from wet process phosphoric acid production. The increased filtration rate translates into increased filter capacity, which equates to greater phosphoric acid production rates. Additionally, agglomeration or nucleation of the finely dispersed, suspended solid particles/precipitates improves the efficiency of subsequent clarification processes in the phosphoric acid production stream. The filtration/clarifying aids described herein also provide a useful alternative to those reagents currently used in the field.

The polymeric microparticles described herein as useful for filtration and/or clarifying aids have not previously been used for this purpose, but are designed as flocculants for use in the water treating and/or paper industries as described by U.S. Pat. No. 4,968,435 to Neff et al. (1990); U.S. Pat. No. 5,171,808 to Ryles et al. (1992). The process streams in these industries have moderate to alkaline pH. In contrast, the process stream of the wet process phosphoric acid production system is a strong acid solution having low to negative pH (typically pH≤1). Additionally, twelve to fifteen different types of mineral scaling species can usually be found throughout the phosphoric acid production process and they pose significant challenges for the industry. Moreover, different phosphoric acid production plants experience different types of mineral species. Even within one plant, the type of minerals can differ greatly between steps in the process or even between phosphate ore composition. Additionally, because variations of rock quality and differences in solubility, each concentration step produces waste precipitates that require selection of specialized chemistries to aid efficient clarification. It is therefore unexpected to find that the polymeric microparticles previously described in the prior art are useful as filtration and/or clarifying aids in phosphoric acid production according to the methods described herein.

In one aspect, the present invention provides methods for enhancing the filtration rate of phosphoric acid produced by the wet process and containing suspended insoluble particulates (i.e., phosphoric acid slurry solids), by adding to the phosphoric acid at any stage of the production process an effective amount of a reagent having polymeric microparticles, wherein said microparticles are characterized as being anionic or amphoteric and having a weight average molecular weight of greater than 60 Million Da (1 dalton being equivalent to 1 g/mol); and filtering the phosphoric acid, thereby enhancing the filtration rate of the phosphoric acid.

In another aspect, the invention provides methods for clarifying a phosphoric acid solution produced by the wet process and containing suspended insoluble particulates, by adding to the phosphoric acid solution or slurry an effective amount of a reagent having polymeric microparticles characterized as being anionic or amphoteric, and having a weight average molecular weight of greater than 60 Million Da; and separating the phosphoric acid from the insoluble precipitates, thereby clarifying the phosphoric acid.

In another aspect, the invention provides an improvement in a wet process phosphoric acid production process having the steps of digesting phosphate rock in a slurry containing sulfuric acid, thereby releasing phosphoric acid and forming suspended insoluble particulates, and then separating the phosphoric acid from the suspended insoluble particulates by a filtration and/or clarifying aid, the improvement including: adding to the slurry an effective amount of a reagent having polymeric microparticles as described herein, thereby enhancing the filtration rate and/or clarity of the phosphoric acid.

As those skilled in the art will appreciate, any of the above aspects of the invention could also form the steps for methods for increasing phosphoric acid production obtained from a phosphoric acid slurry.

These and other objects, features and advantages of this invention will become apparent from the following detailed description of the various embodiments of the invention taken in conjunction with the accompanying FIGURES and Examples.

BRIEF DESCRIPTION OF THE DRAWINGS

So that the manner in which the above-recited features of the present invention can be understood in better detail, a more particular description of the invention may be had by reference to embodiments, some of which are illustrated or captured in the appended FIGURES. It is to be noted, however, that the appended FIGURES represent only typical embodiments of this invention and should not be considered limiting of its scope, for the invention may admit to other equally effective embodiments.

DETAILED DESCRIPTION OF CERTAIN EMBODIMENTS OF THE INVENTION

Figure 1:
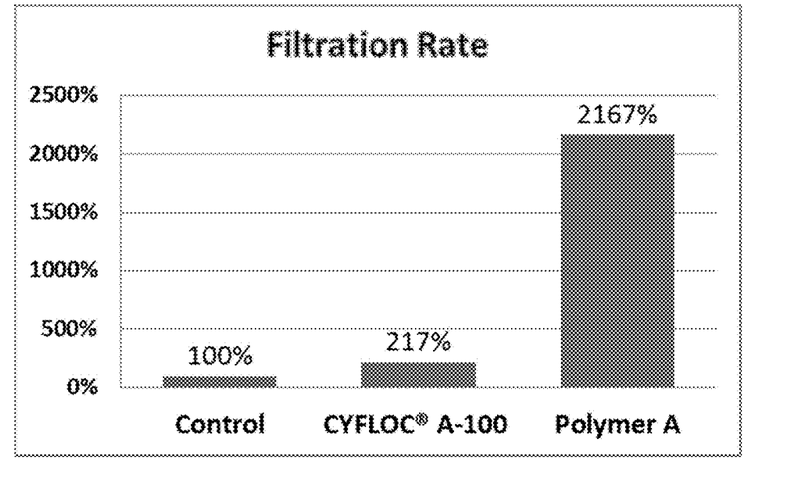
FIG. 1 graphically illustrates the filtration rate of the samples listed in Table 3 of Example 14 as a percentage, wherein the filtration rate of the Control sample (2.31 g/min.) represents 100%; the filtration rate of CYFLOC® A-100 (5 g/min.) is 217%; and the filtration rate of Polymer A (invention) (50 g/min.) is 2167%.

As summarized above, the present invention is based at least in part on the discovery that certain polymeric microparticles are useful for improving filtration rate and/or clarifying phosphoric acid produced by the wet process. The suspended solid particulates in this industrial process include the insoluble species in phosphate rock formed during digestion, newly formed particulates produced during digestion of phosphate rock (i.e., precipitates), and newly formed particulates during further concentration of the phosphoric acid (mainly caused by oversaturation). Such particulates can also be referred to as slurry solids, precipitates, fine particles, or solid particles.

The successful application of such reagents in the enhancement of the filtration rate and/or clarification of phosphoric acid is surprising due, at least in part, to the discovery of a correlation between the composition and crosslinker ratio of polymer product. Moreover, the discovery that polymeric microparticles containing a certain percentage of carboxyl functional groups and a certain amount of crosslinking agents are more effective at improving the filtration rate and/or clarification of phosphoric acid slurries than those slurries without such polymeric microparticles, or those slurries having polymer reagents with linear structure, is unexpected since it was not predictable that such polymeric microparticles would be useful for WPA due to the inherent highly acidic environment.

As employed throughout the disclosure of the invention, the following terms are provided to assist the reader. Unless otherwise defined, all terms of art, notations and other scientific or industrial terms or terminology used herein are intended to have the meanings commonly understood by those of skill in the chemical arts. In some cases, terms with commonly understood meanings are defined herein for clarity and/or for ready reference, and the inclusion of such definitions herein should not necessarily be construed to represent a substantial difference over the definition of the term as generally understood in the art unless otherwise indicated. As used herein and in the appended claims, the singular forms include plural referents unless the context clearly dictates otherwise. Throughout this specification, the terms retain their definitions.

The term "polymer" has its usual and customary meaning and refers to the polymerization product of one or more monomers and is inclusive of homo-, co-, ter-, tetra-polymers, etc.

The term "monomer" refers to ethylenically unsaturated compounds that can polymerize. The monomers for use in the practice of the present invention can be anionic, cationic, or non-ionic and can be readily dispersed in water. The term "monomeric unit" refers to a part of a polymer whose repetition would produce the polymer chain by linking the monomeric units together successively along the chain.

The term "polymeric microparticles" as used herein refers to polymeric organic microparticles that have been generally formed by the polymerization of at least one type of a plurality of monomeric unit. Polymeric organic microparticles can also be formed by polymerization of one monomeric unit and one or more co-monomers. In certain embodiments, the polymeric microparticles can be polymerized in the presence of a crosslinker. The term "crosslinker" or "crosslinking agent" refers to polyfunctional crosslinking or branching agents. Polymerization of the monomers can be conducted in the presence of crosslinkers to form the polymeric microparticles. Such polymeric microparticles have been previously described by U.S. Pat. No. 4,968,435 to Neff et al. (1990); and U.S. Pat. No. 5,171,808 to Ryles et al. (1992), the teachings of which are incorporated herein by reference.

The term "crosslinker ratio" is the molar ratio of crosslinker based on the total number of moles of monomeric units present in the polymeric microparticles. Those skilled in the art will appreciate that the polymeric microparticles useful as filtration rate and/or clarifying aids in the methods described herein can include species that include mixtures of polymeric microparticles having different degrees of crosslinking and branching.

As used herein, the terms "carboxylic functional group" in relation to "polymeric microparticles" includes carboxylic acid and/or carboxylate salts thereof in the form of sodium, ammonium, potassium and the like.

"Clarification" or "clarifying" as used herein refers to decreasing the level of, or removing entirely, the cloudiness caused by the insoluble, suspended solid waste particles/precipitates of a liquid, such as that of contained in a phosphoric acid slurry.

The term "ppm" as used in the filtration and clarification processes described herein refers to part per million, and is based on active polymer weight (weight average) and the total weight of the phosphoric acid slurry or stream being treated.

"Effective amount" means the dosage of any additives or reagents on an active basis (such as the polymeric microparticles described herein) necessary to provide the desired performance in the system or sample being treated (such as agglomeration or nucleation of insoluble, suspended fine particles in the phosphoric acid slurry) when compared to an untreated control sample.

Accordingly, in one aspect the invention provides methods for enhancing the removal and filtration rates of solids from phosphoric acid produced by the wet process and containing suspended insoluble precipitates, by adding to the phosphoric acid at any stage of the phosphoric acid production process an effective amount of a reagent including polymeric microparticles characterized as being anionic or amphoteric and having a weight average molecular weight of greater than 60 Million daltons, and then filtering the phosphoric acid, thereby enhancing the filtration rate of the phosphoric acid and simultaneously increasing phosphoric acid production obtained from a phosphoric acid slurry.

In some embodiments the polymeric microparticles can enhance solids removal via enhanced nucleation of saturated species; e.g. gypsum, fluorosilicates, etc.

In another aspect of the invention, methods for clarifying a phosphoric acid solution produced by the wet process are provided, wherein the phosphoric acid contains suspended solids in the form of insoluble particulates. The method can be performed by adding to the phosphoric acid at any stage of the phosphoric acid production process an effective amount of a reagent including the polymeric microparticles as described and characterized herein, and separating the phosphoric acid from the solids, thereby clarifying the acid.

In still another aspect, the invention provides an improvement in wet process phosphoric acid production wherein phosphate rock is digested in a slurry containing sulfuric acid, thereby releasing phosphoric acid and forming suspended insoluble particulates, and then the phosphoric acid is separated from the suspended insoluble particulates using a filtration and/or clarification aid, wherein the improvement includes adding to the process at any stage of the phosphoric acid production process an effective amount of a reagent, as filtration and/or clarification aid, that includes the polymeric microparticles as described and characterized herein, thereby enhancing the filtration rate and/or clarity of the phosphoric acid.

The specific mineralogy of precipitated solids in the phosphoric acid stream is not particularly critical to performing the methods of the invention as the polymeric microparticles useful as filter and/or clarifying aids are especially effective for use against any of the naturally occurring precipitates of the phosphate ore matrix. Generally, the phosphoric acid may contain from 0.5 wt. % to 50 wt. % of solids.

While those of ordinary skill in the art are familiar with general polymerization techniques, the polymers described herein can be made using the general techniques and teachings described in *Principles of Polymerization* $4^{th}$ Ed. by George Odian (2004). Additionally, synthesis pathways for several specific polymeric microparticles contemplated for use with the present invention are exemplified below. While specific pathways have been provided herewith, these can also be generalized to achieve other polymeric microparticles also contemplated for use as filtration rate enhancers and/or clarification aids according to the invention. However, the polymeric microparticles useful as filtration and/or clarifying aids with the methods of the present invention can be produced via multiple routes and are not limited to being produced by a particular process. For example, as those skilled in the art will appreciate, crosslinking of the polymer may occur during or after polymerization. Introduction of anionic functionality (e.g. the carboxylic functional group) can occur due to monomer mix or due to post-functionalization (e.g. hydrolysis). Post-functionalization can occur prior to, during, or after crosslinking.

The polymeric microparticles useful in the methods of the invention are generally characterized as being anionic or amphoteric in nature. For purposes of this application and for brevity, reference to specific anionic or cationic monomers shall also include reference to their corresponding mineral acid salts, alkalai metal salts, and/or alkaline earth metal salts. In some embodiments, the polymeric microparticles contemplated for use with the invention can be derived from the polymerization of a solution including at least one monomer having a carboxylic functional group. The polymeric microparticles can also be derived from the polymerization with one or more co-monomers that can be an anionic monomer, a non-ionic monomer, a cationic monomer, or mixtures thereof.

In certain embodiments, the anionic monomers can include, but are not limited to, acrylic acid; methacrylic acid; ethacrylic acid; maleic acid; malaeic anhydride; acrylate; methacrylate; and 2-acrylamido-2-alkylsulfonic acids, wherein the alkyl group contains from 1 to 6 carbon atoms; or mixtures thereof. A non-limiting example of the 2-acrylamido-2-alkylsulfonic acid, having from 1 to 6 carbon atoms, is 2-acrylamido-2-propane-sulfonic acid. Acrylic acid and its salts are particularly preferred anionic monomers for making the polymeric microparticles for use with the invention. Preferred salt forms for these anionic monomers are sodium or ammonium, for example.

As those skilled in the art will appreciate, several of the anionic monomers discussed herein can also serve as the at least one monomer having a carboxylic functional group for making the polymeric microparticles. Thus, in the same or other embodiments of the invention, the polymeric microparticles include monomers having a carboxylic functional group that can include acrylic acid; methacrylic acid; ethacrylic acid; maleic acid; malaeic anhydride; acrylate; methacrylate; or mixtures thereof.

In the same or other embodiments of the invention, the non-ionic monomers used to achieve certain of the polymeric microparticles for use in the present invention can include, but are not limited to, acrylamide; methacrylamide; N,N-dialkylacrylamides or N-alkylacrylamides, wherein the alkyl group contains from 1 to 12 carbon atoms; N-vinylmethacetamide; N-vinyl methylformamide; N-vinyl pyrrolidone; or mixtures thereof. In a preferred embodiment, the non-ionic monomer used to form the polymeric microparticles is acrylamide.

In the same or other embodiments of the invention, the cationic monomers for use in making the polymeric microparticles for use with the invention include, but are not limited to, acryloxyethyltrimethylammonium chloride; diallyldimethylammonium chloride; 3-(meth)acrylamidopropyltrimethylammonium chloride; 3-acrylamidopropyltrimethylammonium-2-hydroxypropylacrylate methosulfate; trimethylammoniumethyl methacrylate methosulfate; 1-trimethylammonium-2-hydroxypropylmethacrylate methosulfate; ethacryloxyethyltrimethylammonium chloride; or mixtures thereof.

While the cationic monomers listed above are preferred, those skilled in the art will understand that such monomers can also have different anion salts chosen from bromide, fluoride, sulfate, or phosphate. Accordingly, such cationic monomers are also contemplated for use in forming the polymeric microparticles for use with the present invention and should be considered equivalent to those specific cationic monomers listed above.

As indicated by the foregoing description, the inventors have made the surprising discovery that the performance of polymeric microparticles for use in improving filtration rate and/or clarifying acid from wet process phosphoric acid production can be influenced by the molar ratio of carboxyl containing monomeric units to the total number of moles of monomeric units in the polymeric microparticle. While the molar ratio of monomeric units having a carboxyl functional group to the total number of moles of monomeric units required for effective improvement of filtration rate and/or clarification of phosphoric acid may differ from process to process, in certain embodiments of the present invention (e.g., where the polymeric microparticles are anionic in nature), the molar ratio of monomers having carboxyl functional groups in the polymer (i.e., the molar ratio of monomeric units containing carboxyl functional groups to the sum of all moles of monomeric units in the polymeric microparticles) ranges from 3 molar percent to 100 molar percent.

In the same or other embodiments, the molar ratio of monomeric units containing carboxylic functional groups to the sum of all moles of monomeric units in the polymeric microparticles can be from 30 molar percent to 99 molar percent; or from 40 molar percent to 80 molar percent. As those skilled in the art will appreciate, the contemplated ranges are inclusive of the lowest value and of the highest value, and of any specific value there between as denoted by the phrase "et seq." (e.g., 3, 4, 5, 6, 7, 8, et seq., 30, 31, 32, 33, 34, et seq., 35, 40, 41, 42, 43, 44, 45, et seq., 50, 55, 60, 65, 70, 75, 80, 85, 90, 95, 99, and 100 molar percent).

In other embodiments, (e.g., where the polymeric microparticles are amphoteric in nature), the molar ratio of anionic monomers can be from 1 mole % to 99 mole %, and the molar ratio of cationic monomers can be from 99 mole % to 1 mole %.

As further indicated by the foregoing description, the inventors have also made the surprising discovery that the performance of polymeric microparticles for use in improving filtration rate and/or clarifying acid from wet process phosphoric acid production depends on the molar ratio of crosslinkers to the total number of moles of monomeric units in the polymeric microparticles. Polymerization of the monomers occurs in the presence of a polyfunctional crosslinking agent to form the crosslinked composition. The polyfunctional crosslinking agent can include one or more compounds having either at least two double bonds, a double bond and a reactive group, or two reactive groups. Illustrative of those containing at least two double bonds include, but are not limited to, N,N-methylenebisacrylamide; N,N-methylenebismethacrylamide; polyethyleneglycol diacrylate; polyethyleneglycol dimethacrylate; N-vinyl acrylamide; divinylbenzene; triallylammonium salts; and N-methylallylacrylamide.

Those polyfunctional crosslinking agents containing at least one double bond and at least one reactive group can include, but are not limited to, glycidyl acrylate; glycidyl methacrylate; acrolein; and methylolacrylamide. Polyfunctional crosslinker agents containing at least two reactive groups can include, for example, dialdehydes, such as glyoxal; diepoxy compounds; and epichlorohydrin.

Crosslinking agents are to be used in sufficient quantities to assure a crosslinked polymeric microparticle. Typically, at least about 4 molar parts per million of crosslinking agent based on the number of moles of monomeric units present in the polymeric microparticle can be employed to induce sufficient crosslinking. In certain embodiments, the ratio of crosslinkers contained in the crosslinked polymeric microparticles is from 10 molar parts per million to 5000 molar parts per million. In the same or other embodiments, the ratio of crosslinkers contained in the polymeric microparticle is from 50 molar parts per million to 2,000 molar parts per million. Again, those skilled in the art will recognize that the contemplated ratio range for the crosslinkers is inclusive of the lowest value and the highest value, as well as any specific value in between (e.g., 4 molar parts per million, et seq., 50 molar parts per million, et seq., 100, et seq., 200, et seq., 300, et seq., 500, et seq., 700, et seq., 1000, et seq., 1500, et seq., 2000, et seq., 3000, et seq., 4000, et seq., and 5000 molar parts per million).

In one embodiment, the monomer having carboxylic functionality used to make the polymeric microparticles can be acrylate, the co-monomer can be acrylamide, and the crosslinker can be N,N-methylenebisacrylamide (i.e., poly(acrylate-co-acrylamide). In the same or other embodiments, the molar ratio of acrylate can be 60 mol % and that of acrylamide can be 40 mol %. In the same or other embodiments, the amount of crosslinker in the polymeric microparticles can be from 200 ppm, et seq., to 4,000 ppm, and preferably from 500 ppm, et seq., to 3,000 ppm; and more preferably still from 950 ppm, et seq., to 2,000 ppm.

In another embodiment, the polymeric microparticles can include one monomer and two co-monomers to form terpolymer microparticles. One such terpolymer contemplated for use in the present invention includes, but is not limited to, poly(2-acrylamido-2-methyl-1-propanesulfonate-co-acrylate-co-acrylamide) microparticles.

In certain embodiments, the polymeric microparticles for use with the present invention can have an unswollen average particle size diameter, for example, of from 15 nanometer (nm) to 10 micrometers (10,000 nm) or more, including any value in between. In some embodiments, for example, the polymeric microparticles can have an unswollen average particle size of from 15 nanometers, et seq., to 5 micrometers (5,000 nm); or from 20 nanometers, et seq., to 1 micrometer (1,000 nm); or from 50 nanometers, et seq., to 0.750 micrometer (750 nm); or from 100 nanometers, et seq., to 0.500 micrometer (500 nm). Particle size can be determined by routine methods such as by scanning electron microscopy according to manufacturer's directions.

Those skilled in the art will also appreciate that the weight average molecular weight of the polymeric microparticles for use with the present invention is attendant to the particle size of the microparticles as well as the concentration of co-monomers present in the microparticle. In general, in order to achieve desired performance the molar mass of the polymeric microparticles described herein and contemplated for use with the present invention is generally at least 1 Million ("M") daltons ("Da"), or greater, (e.g., greater than 10 M Da; greater than 20 M Da; greater than 30 M Da; greater than 40 M Da; greater than 50 M Da; greater than 60 M Da; greater than 70 M Da; greater than 80 M Da; greater than 90 M Da; or greater than 100 M Da), with an upper limit being contemplated at $1.5 \times 10^8$ M daltons. As those skilled in the art will appreciate, the molecular weight of the polymeric microparticles can be measured by any suitable means known in the art, (e.g. static or dynamic light scattering or by calculation of the reaction).

Accordingly, in certain embodiments of the invention described herein a particularly preferred molar mass range for the polymeric microparticles useful in the methods according to the present invention can be from 100 M Da, et seq. to 60,000 M Da. In some embodiments, the range can be from 140 M Da, et seq. to 2,500 M Da.

The polymeric microparticles for use with the invention have the further characteristic of having a solution viscosity less than 3.0 milliPascal·second ("mPa·s"). Preferably the solution viscosity is in the range of from 1.1 mPa·s to 2.1 mPa·s. Solution viscosity of the polymeric microparticles can be determined according to the methods described in U.S. Pat. No. 5,171,808 to Ryles, et al., which include 0.1% polymeric microparticles in M NaCl, 25° C. using a Brookfield UL adapter at 60 rpm.

In certain embodiments, the filtration rate enhancer and/or clarifying aid can also be utilized with one or more other industrial treatment additives including, for example, other filter and/or clarifying aids, scale inhibitors, biocides, corrosion inhibitors, or dispersants. The prior art is replete with such other industrial treatment additives, which are well known to those ordinarily skilled in the art.

According to the methods of the invention, the reagent including the polymeric microparticles described herein can be added to any stage of a wet process phosphoric acid production stream (e.g., one or more of the milling/grinding stage, digester stage, filtering stage, clarifying stage, concentrating stage, evaporator stage, or centrifugation stage). Accordingly, while the polymeric microparticles may be added at the digester stage, in certain embodiments the reagent containing said microparticles is more preferably added to the phosphoric acid going to the filters or clarifiers. In still other embodiments, the reagent can be added to any of the piping connecting the various stages of the phosphoric acid production process. This is sometimes referred to in the field as the "interstitial piping" or "process flow pipeline". The reagent containing polymeric microparticles as filtration and/or clarifying aid can also be added to a phosphoric acid solutions or slurries outside of the production process.

The filtration rate and/or clarification improving reagents can be in liquid form (such as with water, oil and/or alcohol) and may be formulated in various ways, e.g., the emulsion or solid reagent may be suspended (e.g., colloidal suspension), dispersed and/or slurried in the liquid, and/or the reagent may be suspended, dispersed, slurried and/or dissolved in the liquid. The filtration rate and/or clarification improving reagents described herein may be intermixed in the phosphoric acid production process in various ways, e.g., in a single stage, in multiple stages, sequentially, in reverse order, simultaneously, or in various combinations thereof. For example, in one embodiment, the filtration rate and/or clarification improving reagent is added to form a pre-mix, then intermixed with the phosphoric acid. Various modes of addition will be found to be effective and can be adjusted using no more than routine experimental techniques.

Those skilled in the art will recognize that effective dosage of reagent containing polymeric microparticles is a function of the particular system being treated. The effective amount of polymeric microparticles used to improve filtration rate and/or clarification of phosphoric acid containing insoluble waste solids will vary depending upon the particular polymeric microparticles used and/or the severity of the problem encountered, as well as the concentration. Also a factor for dosing can be the nature of the suspended solid particulates present in the phosphoric acid solution or slurry (i.e., the species, sizes, size distributions, and morphologies of particulates). In general, the dosage of reagent in the form of polymeric microparticles is based on active polymer weight and the total weight of the phosphoric acid solution or slurry being treated, and can range from 0.1 g/ton, et seq., to 5,000 g/ton of phosphoric acid. In certain embodiments, the dosage of reagent required for performance can be from 0.5 g/ton, et seq., to 1,000 g/ton of phosphoric acid solution, and preferably from 1.0 g/ton, et seq., to 500 g/ton of phosphoric acid solution. In other embodiments, the dosage of active polymer can be from 10 g/ton, et seq., to 100 g/ton of phosphoric acid solution. Those skilled in the art will recognize that the contemplated dosage range includes the lower dose value and higher dose value, inclusive, as well as any specific dose value there between.

In view of the aforementioned discussion of the present invention, the invention includes at least the following embodiments:

Embodiment 1

A method for enhancing the filtration rate of phosphoric acid produced by the wet process and containing suspended insoluble precipitates, the method comprising:

adding to the phosphoric acid at any stage of the phosphoric acid production process an effective amount of a reagent comprising polymeric microparticles, wherein said microparticles are characterized as being anionic or amphoteric and have a weight average molecular weight of greater than 60 Million Da; and filtering the phosphoric acid, thereby enhancing the filtration rate of the phosphoric acid.

Embodiment 2

A method for clarifying phosphoric acid produced by the wet process and containing suspended insoluble precipitates, the method comprising:

adding to the phosphoric acid at any stage of the phosphoric acid production process an effective amount of a reagent comprising polymeric microparticles, wherein said microparticles are characterized as being anionic or amphoteric and have a weight average molecular weight of greater than 60 Million Da; and separating the phosphoric acid from the insoluble precipitates, thereby clarifying the phosphoric acid.

Embodiment 3

A method for increasing phosphoric acid production obtained from a phosphoric acid slurry produced in a wet process and containing suspended insoluble precipitates, the method comprising:
adding to the phosphoric acid at any stage of the phosphoric acid production process an effective amount of a reagent comprising polymeric microparticles, wherein said microparticles are characterized as being anionic or amphoteric and have a weight average molecular weight of greater than 60 Million Da; and
filtering the phosphoric acid, thereby enhancing the filtration rate and throughput of the phosphoric acid.

Embodiment 4

A method of reducing the loss of phosphoric acid produced in a wet process and containing suspended insoluble particles, the method comprising:
adding to the phosphoric acid at any stage of the phosphoric acid production process an effective amount of a reagent comprising polymeric microparticles, wherein said microparticles are characterized as being anionic or amphoteric and have a weight average molecular weight of greater than 60 Million Da; and
filtering the phosphoric acid, thereby reducing the amount of soluble and insoluble phosphoric acid remaining in a filter cake.

Embodiment 5

In a wet process phosphoric acid production process comprising the steps of digesting phosphate rock in a slurry containing sulfuric acid, thereby releasing phosphoric acid and forming suspended insoluble precipitates, and then separating the phosphoric acid from said suspended insoluble precipitates by a filtration and/or clarifying aid, the improvement comprising:
adding to said slurry an effective amount of a reagent comprising polymeric microparticles, wherein said microparticles are characterized as being anionic or amphoteric and have a weight average molecular weight of greater than 60 Million Da, thereby enhancing the filtration rate and/or clarity of the phosphoric acid.

Embodiment 6

A method according to any one of embodiments 1 to 5, wherein the polymeric microparticles comprise at least one anionic monomer having a carboxylic functional group and selected from the group consisting of acrylic acid; methacrylic acid; ethacrylic acid; maleic acid; acrylate; and methacrylate.

Embodiment 7

A method according to any one of embodiments 1 to 6, wherein the polymeric microparticles are amphoteric and comprise from 1 mole % to 99 mole % of an anionic monomer and from 99 mole % to 1 mole % of a cationic monomer.

Embodiment 8

A method according to embodiment 7, wherein the cationic monomer is selected from the group consisting of:
acryloxyethyltrimethylammonium chloride;
diallydimethylammonium chloride;
3-(meth)acrylamidopropyltrimethylammonium chloride;
3-acrylamidopropyltrimethylammonium-2-hydroxypropylacrylate methosulfate;
trimethylammoniumethyl methacrylate methosulfate;
1-trimethylammonium-2-hydroxypropylmethacrylate methosulfate;
ethacryloxyethyltrimethylammonium chloride;
any of the preceding compounds with salts of other anions; and
mixtures of any of the above.

Embodiment 9

A method according to any one of embodiments 1 to 6, wherein the polymeric microparticles comprise at least one ethylenically unsaturated non-ionic monomer.

Embodiment 10

A method according to embodiment 9, wherein the non-ionic monomer is selected from the group consisting of acrylamide; methacrylamide; N,N-dialkylacrylamides; N-alkylacrylamides; N-vinylmethacetamide; N-vinylmethylformamide; N-vinyl pyrrolidone; and mixtures thereof.

Embodiment 11

A method according to embodiment 9 or embodiment 10, wherein the polymeric microparticles comprise acrylic acid and acrylamide monomers.

Embodiment 12

A method according to embodiment 6, wherein the at least one anionic monomer is present from 3 mole % to 100 mole %, based on the total mole % of monomeric units in the polymeric microparticles.

Embodiment 13

A method according to any one of embodiments 6 to 12, wherein the at least one anionic monomer is present from 30 mole % to 99 mole %, based on the total mole % of monomeric units in the polymeric microparticles.

Embodiment 14

A method according to embodiment 13, wherein the at least one anionic monomer is present from 40 mole % to 90 mole %, based on the total mole % of monomeric units in the polymeric microparticles.

Embodiment 15

A method according to embodiment 14, wherein the molar ratio of acrylic acid monomers to acrylamide monomers is 60 mole % to 40 mole %.

Embodiment 16

A method according to any one of embodiments 11, 13, and 14 wherein the polymeric microparticles further comprise 2-acrylamido-2-methyl-1-propanesulfonate.

Embodiment 17

A method according to any one of the preceding embodiments, wherein the polymeric microparticles are crosslinked by a polyfunctional crosslinking agent selected from the group consisting of N,N'-methylenebisacrylamide; N,N'-methylenebismethacrylamide; polyethyleneglycol diacrylate; polyethyleneglycol dimethacrylate; N-vinyl acrylamide; triallylammonium salts; N-methylallylacrylamide; methylolacrylamide; glycidyl acrylate; divinylbenzene; acrolein; gyloxal; diepoxy compounds; epichlorohydrin; and mixtures thereof.

Embodiment 18

A method according to embodiment 17, wherein the polyfunctional crosslinking agent comprises N,N'-methylenebisacrylamide.

Embodiment 19

A method according to embodiment 17 or embodiment 18, wherein the polyfunctional crosslinking agent has a molar ratio from 10 molar parts per million to 5,000 molar parts per million based on the total mole % of monomers present in the polymeric microparticle.

Embodiment 20

A method according to embodiment 19, wherein the polyfunctional crosslinking agent has a molar ratio from 50 molar parts per million to 2,000 molar parts per million based on the total mole % of monomers present in the polymeric microparticle.

Embodiment 21

A method according to any one of the preceding embodiments, wherein the weight average molecular weight of said polymeric microparticles is up to and including $1.5 \times 10^8$ million Daltons.

Embodiment 22

A method according to embodiment 21, wherein the weight average molecular weight of said polymeric microparticles is from 100 million Daltons to 2,500 million Daltons.

Embodiment 23

A method according to any one of the preceding embodiments, wherein the polymeric microparticles are further characterized by having a solution viscosity of less than 3.0 mPa·s.

Embodiment 24

A method according to embodiment 23, wherein the solution viscosity is from 1.1 mPa·s to 2.1 mPa·s.

Embodiment 25

A method according to any one of the preceding embodiments, wherein the polymeric microparticles are added at one or more of the filter stage, clarifying stage, concentrating stage, or evaporation stage.

Embodiment 26

A method according to any one of the preceding embodiments, wherein the polymeric microparticles are added in an amount from 0.1 g/ton, et seq., to 5,000 g/ton of phosphoric acid.

Embodiment 27

A method for enhancing the filtration rate of phosphoric acid produced by the wet process and containing suspended insoluble precipitates, the method comprising:
adding to the phosphoric acid at any stage of the phosphoric acid production process an effective amount of a reagent comprising crosslinked polymeric microparticles polymerized from at least one monomer having a carboxylic functional group and characterized as having a weight average molecular weight of 1 Million Da or greater; and
filtering the phosphoric acid, thereby enhancing the filtration rate of the phosphoric acid.

Embodiment 28

A method according to embodiment 27, wherein the crosslinked polymeric microparticles are substantially as described and exemplified herein.

The following examples are provided to assist one skilled in the art to further understand certain embodiments of the present invention. These examples are intended for illustration purposes and should not be construed as limiting the scope of the present invention.

Example 1-7—Synthesis of Poly(acrylate-co-acrylamide) Microparticles with Various Crosslinking Densities (with the Molar Ratio of Acrylate to Acrylamide being at 60:40)

The polymer can be prepared using inverse emulsion polymerization. In one embodiment, 96.5 g of acrylic acid (AA) (99 wt. %, 1.33 mol), 119.8 g of acrylamide (AMD) aqueous solution (53 wt. %, 0.89 mol), and 87.2 g of water is mixed together to prepare a monomer aqueous solution in one beaker. 94.3 g of sodium hydroxide aqueous solution (50 wt. %) is added to the monomer solution (in ice bath) under agitation to adjust the pH of monomer solution to around 7 with the temperature controlled to be below 25° C. 0.32 g of N,N'-methylenebisacrylamide (MBA) (99 wt. %, 0.00208 mol, crosslinker ratio is the molar ratio of moles of MBA to the sum of moles of AA and AMD monomeric units, which equals to 940 molar parts per million for this experiment), 0.32 g of diethylenetriamine pentaacetic acid (DTPA) aqueous solution (40 wt. %), and 1.6 g of tert-butyl hydroperoxide aqueous solution (2.1 wt. %) are then added and dissolved/mixed in the neutralized monomer solution to prepare the aqueous phase.

In a second beaker, 4.4 g of sorbitan sesquioleate (99 wt. %) and 67.6 g of polyethyleneglycol sorbitol hexaoleate (99 wt. %) are mixed with 328 g of aliphatic alkanes (such as ESCAID® 110 from ExxonMobil) to prepare the oil phase. The aqueous phase is then added to the oil phase slowly under agitation and the mixture is then transferred into a 1000 ml jacketed reactor. The mixture is purged with nitrogen for 30 minutes under agitation and then introduced with $SO_2$ (4000 ppm in $N_2$) stream to initiate the polymerization.

After polymerization for 30 minutes, the jacketed reactor is connected to a 40° C. water circulation bath. The mixture is allowed to polymerize for another hour at 40° C. Then the prepared polymer emulsion is cooled to room temperature and discharged from the reactor. The composition of prepared polymeric microparticles is confirmed by NMR according to manufacturer's directions.

The amount of N,N'-methylenebisacrylamide crosslinker can be varied to adjust the crosslinking ratio of the polymeric microparticles. The prepared samples are shown in Table 1.

TABLE 1

| Example | Molar Ratio of AA to AMD | Molar Part Per Million of MBA to the sum of AA and AMD | Prepared sample |
|---|---|---|---|
| Example 1 | 60:40 | 940 | Polymer A |
| Example 2 | 60:40 | 0 | Polymer B |
| Example 3 | 60:40 | 14 | Polymer C |
| Example 4 | 60:40 | 94 | Polymer D |
| Example 5 | 60:40 | 1900 | Polymer E |
| Example 6 | 60:40 | 4600 | Polymer F |
| Example 7 | 60:40 | 9100 | Polymer G |

Example 8—Synthesis of Poly(acrylate-co-acrylamide) Microparticles with Various Crosslinking Densities (with the Molar Ratio of Acrylate to Acrylamide being at 30:70)

30 g of acrylic acid (99 wt. %, 0.41 mol), 130.2 g of acrylamide aqueous solution (53 wt. %, 0.97 mol), and 52.2 g of water is mixed together to prepare a monomer aqueous solution in one beaker. 26.1 g of sodium hydroxide aqueous solution (50 wt. %) is added to the monomer solution (in ice bath) under agitation to adjust the pH of monomer solution to around 7 with the temperature controlled to be below 25° C. 0.2 g of N,N'-methylenebisacrylamide (99 wt. %, 0.0013 mol, the molar ratio of moles of MBA to the sum of moles of AA and AMD monomeric units is 940 molar parts per million), 0.24 g of diethylenetriamine pentaacetic acid (DTPA) aqueous solution (40 wt. %), and 1.2 g of tert-butyl hydroperoxide aqueous solution (2.1 wt. %) are then added and dissolved/mixed in the neutralized monomer solution to prepare the aqueous phase.

In a second beaker, 18 g of sorbitan sesquioleate (99 wt. %) and 111.6 g of polyethyleneglycol sorbitol hexaoleate (99 wt. %) are mixed with 230 g of aliphatic alkanes (such as ESCAID® 110 from ExxonMobil) to prepare the oil phase. The aqueous phase is then added to the oil phase slowly under agitation and the mixture is then transferred into a 1000 ml jacketed reactor. The mixture is purged with nitrogen for 30 minutes under agitation and then introduced with $SO_2$ (4000 ppm in N2) stream to initiate the polymerization. After polymerization for 30 minutes, the jacketed reactor is connected to a 40° C. water circulation bath. The mixture is allowed to polymerize for another hour at 40° C. Then the prepared polymer emulsion is cooled to room temperature and discharged from the reactor. The composition of prepared polymeric microparticles is confirmed by NMR according to manufacturer's directions. The prepared sample is Polymer H.

The amount of N,N'-methylenebisacrylamide crosslinker can be varied to adjust the crosslinking ratio of polymeric microparticles.

Example 9—Synthesis of Polyacrylate Microparticles with Various Crosslinking Densities 90 g of acrylic acid (99 wt. %, 1.24 mol) and 122 g of water is mixed together to prepare a monomer aqueous solution in one beaker. 98 g of sodium hydroxide aqueous solution (50 wt %) is added to the monomer solution (in ice bath) under agitation to adjust the pH of monomer solution to around 7 with the temperature controlled to be below 25° C. 0.18 g of N,N'-methylenebisacrylamide (99 wt. %, 0.0012 mol, the molar ratio of moles of MBA to moles of AA monomeric units is 940 molar parts per million), 0.23 g of diethylenetriamine pentaacetic acid (DTPA) aqueous solution (40 wt. %), and 1.2 g of tert-butyl hydroperoxide aqueous solution (2.1 wt. %) are then added and dissolved/mixed in the neutralized monomer solution to prepare the aqueous phase.

In a second beaker, 18 g of sorbitan sesquioleate (99 wt. %) and 111.6 g of polyethyleneglycol sorbitol hexaoleate (99 wt. %) are mixed with 230 g of aliphatic alkanes (such as ESCAID® 110 from ExxonMobil) to prepare the oil phase. The aqueous phase is then added to the oil phase slowly under agitation and the mixture is then transferred into a 1000 ml jacketed reactor. The mixture is purged with nitrogen for 30 minutes under agitation and then introduced with $SO_2$ (4000 ppm in N2) stream to initiate the polymerization. After polymerization for 30 minutes, the jacketed reactor is connected to a 40° C. water circulation bath. The mixture is allowed to polymerize for another hour at 40° C. Then the prepared polymer emulsion is cooled to room temperature and discharged from the reactor. The composition of prepared polymeric microparticles is confirmed by NMR according to manufacturer's directions. The prepared sample is Polymer I.

The amount of N,N'-methylenebisacrylamide crosslinker can be varied to adjust the crosslinking ratio of polymeric microparticles.

Example 10—Synthesis of Polyacrylamide Microparticles with Various Crosslinking Densities 187.8 g of acrylamide (53 wt. %, 1.4 mol) and 51.2 g of water is mixed together to prepare a monomer aqueous solution in one beaker. 0.1 g of sodium hydroxide aqueous solution (50 wt. %) is added to the monomer solution under agitation to adjust the pH of monomer solution to around 7. 0.2 g of N,N'-methylenebisacrylamide (99 wt. %, 0.0013 mol, the molar ratio of moles of MBA to moles of AMD monomeric units is 940 molar parts per million), 0.24 g of diethylenetriamine pentaacetic acid (DTPA) aqueous solution (40 wt. %), and 1.2 g of tert-butyl hydroperoxide aqueous solution (2.1 wt. %) are then added and dissolved/mixed in the neutralized monomer solution to prepare the aqueous phase.

In a second beaker, 18 g of sorbitan sesquioleate (99 wt. %) and 111.6 g of polyethyleneglycol sorbitol hexaoleate (99 wt. %) are mixed with 230 g of aliphatic alkanes (such as ESCAID® 110 from ExxonMobil) to prepare the oil phase. The aqueous phase is then added to the oil phase slowly under agitation and the mixture is then transferred into a 1000 ml jacketed reactor. The mixture is purged with nitrogen for 30 minutes under agitation and then introduced with $SO_2$ (4000 ppm in N2) stream to initiate the polymerization. After polymerization for 30 minutes, the jacketed reactor is connected to a 40° C. water circulation bath. The mixture is allowed to polymerize for another hour at 40° C. Then the prepared polymer emulsion is cooled to room temperature and discharged from the reactor. The composition of prepared polymeric microparticles is confirmed by NMR according to manufacturer's directions. The prepared sample is Polymer J.

The amount of N,N'-methylenebisacrylamide crosslinker can be varied to adjust the crosslinking ratio of polymeric microparticles.

Example 11-12—Synthesis of poly(2-acrylamido-2-methyl-1-propanesulfonate-co-acrylate-co-acrylamide) Microparticles with Various Crosslinking Densities (the Molar Ratio of 2-acrylamido-2-methyl-1-propanesulfonate to Acrylate to Acrylamide is at 5:55:40, Respectively)

11.6 g of 2-acrylamido-2-methyl-1-propanesulfonic acid (AMPS) (99 wt. %, 0.055 mol), 44.1 g of acrylic acid (99 wt. %, 0.606 mol), 59.8 g of acrylamide aqueous solution (53 wt. %, 0.445 mol), and 34 g of water is mixed together to prepare a monomer aqueous solution in one beaker. 50 g of sodium hydroxide aqueous solution (50 wt. %) is added to the monomer solution (in ice bath) under agitation to adjust the pH of monomer solution to around 7 with the temperature controlled to be below 25° C. 0.16 g of N,N'-methylenebisacrylamide (99 wt. %, 0.001 mol, the molar ratio of moles of MBA to the sum of moles of AA, AMD and AMPS monomeric units is 940 molar parts per million), 0.16 g of diethylenetriamine pentaacetic acid (DTPA) aqueous solution (40 wt. %), and 0.8 g of tert-butyl hydroperoxide aqueous solution (2.1 wt. %) are then added and dissolved/mixed in the neutralized monomer solution to prepare the aqueous phase.

In a second beaker, 2.2 g of sorbitan sesquioleate (99 wt. %) and 33.9 g of polyethyleneglycol sorbitol hexaoleate (99 wt. %) are mixed with 165 g of aliphatic alkanes (such as ESCAID® 110 from ExxonMobil) to prepare the oil phase. The aqueous phase is then added to the oil phase slowly under agitation and the mixture is then transferred into a 1000 ml jacketed reactor. The mixture is purged with nitrogen for 30 minutes under agitation and then introduced with $SO_2$ (4000 ppm in N2) stream to initiate the polymerization. After polymerization for 30 minutes, the jacketed reactor is connected to a 40° C. water circulation bath. The mixture is allowed to polymerize for another hour at 40° C. Then the prepared polymer emulsion is cooled to room temperature and discharged from the reactor. The composition of prepared polymeric microparticles is confirmed by NMR according to manufacturer's directions.

The amount of N,N'-methylenebisacrylamide crosslinker can be varied to adjust the crosslinking ratio of polymeric microparticles. The prepared samples are listed in Table 2.

TABLE 2

| Example | Molar Ratio of AMPS to AA to AMD | Molar Part Per Million of MBA to the sum of AA and AMD | Prepared sample |
|---|---|---|---|
| Example 11 | 5:55:40 | 940 | Polymer K |
| Example 12 | 5:55:40 | 94 | Polymer L |

Example 13—Process for Filtration Test

The performance of polymeric microparticles useful as reagents for filtration rate enhancement in wet process phosphoric acid production is measured via a vacuum filtration test. The general procedure for the test is outlined below, which is based on the generation of 10 individual samples. Those skilled in the art will appreciate that different starting and ending volumes may be used to generate greater or fewer samples. The acid may also be concentrated to a greater or lesser degree.

In a ventilated hood, 600 g of 28 wt. % process phosphoric acid ($P_2O_5$) is added to a 1 L Teflon beaker. The total weight of the acid and beaker is recorded. The acid is reduced in weight to approx. 300 g (i.e., concentrated to approx. 56 wt. % $P_2O_5$) by heating on a hot plate (Thermo Scientific Cimarec) set at 120° C. with moderate stirring (set at 6). Due to the oversaturation, a large amount of fine particles form during the concentration process. The concentrated acid with suspended fine particles is used as the acid slurry for filtration test. The suspended fine particles can also be separated from the concentrated acid and then dosed to phosphoric acids at various concentrations (wt. % $P_2O_5$) to generate phosphoric acid slurries at various acid concentrations.

30 g of hot concentrated phosphoric acid slurry is first added to a 4 oz. glass vial. For 10 ppm dosage of reagent, 0.3 g of 0.1 wt. % (based on active dry component) solution of the reagent of interest is added to the acid slurry in the 4 oz. glass vial under agitation. 0.3 g of water is added to the control vial. The vial is agitated for another 20 seconds to ensure good mixing to form a homogenous slurry mixture. Then the mixture in the glass vial is transferred to a filtration funnel (on a filtration setup with a 45 µm polypropylene net filter (Millipore PP4504700)) and the vacuum filtration (around 0.2 bar) starts one minute later. The time at which all the acid passes through the filter is recorded and used to calculate filtration rate.

Example 14—Evaluation of the Relative Performance of Polymer Samples for Filtration Rate Enhancement Polymer samples A to L are synthesized using inverse emulsion polymerization as indicated in Examples 1 to 12. The performance of prepared polymers as phosphoric acid filtration rate enhancers is measured in the filtration test as indicated by Example 13. Results are shown in Tables 3, 4, and 5. Each table represents a different set of tests. Control sample is sample added with water (instead of polymer solutions).

TABLE 3

| Sample | Dosage (ppm) | Time to filter 30 g of concentrated phosacid slurry (min) | Filtration Rate (g/min) |
|---|---|---|---|
| Control | 10 | 13 | 2.31 |
| *CYFLOC ® A-100 (linear low anionic polyacrylamide) | 10 | 6 | 5 |
| Polymer A | 10 | 0.6 | 50 |

*comparative

TABLE 4

| Sample | Dosage (ppm) | Time to filter 30 g of concentrated phosacid slurry (min) | Filtration Rate (g/min) |
| --- | --- | --- | --- |
| Control | 10 | 240 | 0.13 |
| Polymer A | 10 | 2.6 | 11.5 |
| Polymer J | 10 | 120 | 0.25 |
| Polymer K | 10 | 3.7 | 8.11 |
| Polymer L | 10 | 11 | 2.7 |
| Polymer H | 10 | 60 | 0.5 |
| Polymer I | 10 | 180 | 0.17 |

TABLE 5

| Sample | Dosage (ppm) | Time to filter 30 g of concentrated phosacid slurry (min) | Filtration Rate (g/min) |
| --- | --- | --- | --- |
| Polymer A | 10 | 1.5 | 20 |
| Polymer B | 10 | 23 | 1.3 |
| Polymer C | 10 | 19 | 1.6 |
| Polymer D | 10 | 9 | 3.3 |
| Polymer E | 10 | 5.5 | 5.5 |
| Polymer F | 10 | 22 | 1.4 |
| Polymer G | 10 | 50 | 0.6 |

The results indicate that there is a correlation between the composition and crosslinker ratio of polymer product and the capability of filtration rate enhancement for phosphoric acid. Polymeric microparticles containing a certain percentage of carboxylic acid functional groups and a certain amount of crosslinkers are more effective at improving filtration rate of phosphoric acid slurries than either control samples or polymer samples with a linear structure (e.g., CYFLOC® A-100). Such reagents show that they generate larger aggregates faster than linear polymeric structures.

Example 15—Evaluation of Polymer Samples as Filtration Rate Enhancers in a Pilot Facility The performance of prepared polymers as phosphoric acid filtration rate enhancers is also measured in a pilot facility using its general operational process. Results are shown in Table 6.

TABLE 6

| Sample | Dosage (ppm) | Filtration Rate (metric ton $P_2O_5$/(day*m$^2$)) |
| --- | --- | --- |
| Polymer I | 20 | 2.38 |
| Polymer A | 20 | 2.58 |
| Polymer L | 20 | 2.28 |
| Polymer C | 20 | 1.93 |
| Control 1 | — | 2.11 |
| Polymer J | 20 | 2.01 |
| Control 2 | — | 2.07 |

The results indicate that there is a correlation between the composition and crosslinker ratio of polymer product and the capability of filtration rate enhancement for phosphoric acid—that is, polymeric microparticles containing a certain percentage of carboxylic acid functional groups and a certain amount of crosslinkers are more effective at improving filtration rate of phosphoric acid slurries than either control samples or polymer samples not having a sufficient amount of carboxylic acid functional groups and/or crosslinkers.

Example 16—Process for Clarification Test

The performance of polymeric microparticles useful as clarification aids in wet process phosphoric acid production is measured via a settling test. The general procedure for the test is outlined below, which is based on the generation of 10 individual samples. Those skilled in the art will appreciate that different starting and ending volumes may be used to generate greater or fewer samples. The acid may also be concentrated to a greater or lesser degree using routine means.

In a ventilated hood, 600 g of 28 wt. % process phosphoric acid ($P_2O_5$) is added to a 1 L Teflon beaker. The total weight of the acid and beaker is recorded. The acid is reduced in weight to approx. 300 g (i.e., concentrated to approx. 56 wt. % $P_2O_5$) by heating on a hot plate (Thermo Scientific Cimarec) set at 120° C. with moderate stirring (set at 6). Due to the oversaturation, a large amount of fine particles form during the concentration process. The concentrated acid with suspended fine particles is used as the acid slurry for filtration test. The suspended fine particles can also be separated from the concentrated acid and then dosed to phosphoric acids at various concentrations (wt. % $P_2O_5$) to generate phosphoric acid slurries at various acid concentrations.

40 g of hot concentrated phosphoric acid slurry is first added to a 30-milliliter (ml) KIMAX® beaker (graduated in 10 ml intervals). For 10 ppm dosage of reagent, 0.4 g of 0.1 wt. % (based on active dry component) solution of the reagent of interest is added to the acid slurry in the graduated beaker under agitation. 0.4 g of water is added to the control beaker. The beaker is agitated for another 20 seconds to ensure good mixing to form a homogenous slurry mixture. Then the graduated beaker is left to sit on bench for the particulates in acid slurry to settle. The settling rate of the flocculated acid suspension is determined by measuring the amount of time needed for the flocculated particulates to settle from the 25-ml mark to the 15-ml mark on the KIMAX® beaker. The distance between the 25-ml mark to the 15-ml mark on the 30-ml KIMAX® beaker is 13 millimeter (mm). And after a settling period of 30 minutes to 2 hours, a 10 ml sample of the supernatant acid is carefully withdrawn for turbidity measurement to determine the amount of unsettled particulates.

Turbidity of the supernatant acid is measured with a HACH® 2100Q portable turbidimeter (nephelometer), or other equivalent, which is calibrated and used according to directions in the instruction manual. Units of measurement are given as Nephelometric Turbidity Units (NTUs), with lower NTUs representing less suspended particles in the sample solution. HACH® 2100Q portable turbidimeter has an upper limit reading of 1000 NTUs. For acid sample with turbidity reading over the limit, the sample is first diluted with clear phosphoric acid, and then the turbidity measurement is conducted. The turbidity reading of the diluted sample is then used to back-calculate the turbidity of the original sample. For purposes of the invention a lower NTU is desirable and indicates less suspended particulates and is predictive of the reagent being more effective as clarification aids for wet process phosphoric acid productions streams.

Example 17—Evaluation of the Relative Performance of Polymer Samples as Clarification Aids Polymer samples A to L are synthesized using inverse emulsion polymerization as indicated in Examples 1 to 12.

The performance of prepared polymers as phosphoric acid clarification aid is measured with the settling test as indicated by Example 16. Results are shown in Table 7 and 8. Each table represents a different set of tests. Control sample is sample added with water (instead of polymer solutions).

TABLE 7

| Sample | Dosage (ppm) | Time used for particles to settle for 13 mm (min) | Settling Rate (mm/min) | Turbidity of supernatant acid after settling for 2 hours (NTU) |
|---|---|---|---|---|
| Control | 10 | — | — | 7712 |
| *CYFLOC ® A-100 (linear low anionic polyacrylamide available from Cytec Industries Inc.) | 10 | — | — | 2244 |
| Polymer A | 10 | 7 | 1.9 | 301 |
| Polymer B | 10 | 11 | 1.2 | 402 |
| Polymer C | 10 | 13 | 1.0 | 319 |
| Polymer D | 10 | 9 | 1.4 | 298 |
| Polymer E | 10 | 11 | 1.2 | 294 |
| Polymer F | 10 | 13 | 1.0 | 334 |
| Polymer G | 10 | 15 | 0.9 | 416 |
| Polymer H | 10 | 13 | 1.0 | 408 |
| Polymer I | 10 | — | — | 4432 |
| Polymer J | 10 | — | — | 5032 |
| Polymer K | 10 | 9 | 1.4 | 266 |
| Polymer L | 10 | 9 | 1.4 | 332 |

*comparative

TABLE 8

| Sample | Dosage (ppm) | Time used for particles to settle for 13 mm (min) | Settling Rate (mm/min) | Turbidity of supernatant acid after settling for 30 minutes (NTU) |
|---|---|---|---|---|
| Polymer B | 10 | 10 | 1.3 | 440 |
| Polymer B | 40 | 4 | 3.3 | 340 |
| Polymer B | 100 | 4 | 3.3 | 381 |
| Polymer D | 10 | 7 | 1.9 | 377 |
| Polymer D | 40 | 4 | 3.3 | 231 |
| Polymer D | 100 | 3 | 4.3 | 150 |
| Polymer A | 10 | 7 | 1.9 | 392 |
| Polymer A | 40 | 4 | 3.3 | 202 |
| Polymer A | 100 | 2 | 6.5 | 137 |
| Polymer G | 10 | 10 | 1.3 | 450 |
| Polymer G | 40 | 7 | 1.9 | 275 |
| Polymer G | 100 | 4 | 3.3 | 182 |
| Polymer H | 10 | 11 | 1.2 | 517 |
| Polymer H | 40 | 7 | 1.9 | 467 |
| Polymer H | 100 | 5 | 2.6 | 391 |
| *CYFLOC ® A-100 (linear low anionic polyacrylamide) | 10 | — | — | 3784 |
| *CYFLOC ® A-100 (linear low anionic polyacrylamide) | 40 | — | — | 4640 |

*comparative

Example 18—Evaluation of Polymer Samples as Clarifying Aids with Plant Slurries

The performance of prepared polymers as phosphoric acid clarifying aids (Polymer A) is also measured in a lab with phosphoric acid slurries generated during the wet process plant production. The phosphoric acid slurries are 44% $P_2O_5$ clarifier feed and are collected from the pipe connecting to the 44% $P_2O_5$ clarifier. In a typical settling test, 1000 ml of diluted phosphoric acid slurries are first transferred to a 1 L cylinder. Then the slurries are plunged with a plunger for 3-5 times to generate uniform phosphoric acid slurries. Afterwards, an aqueous solution of the clarifying aid of interest (here Polymer A) is added to the phosphoric acid slurries and the mixture is slowly plunged (five strokes) to mix the polymeric microparticle solution with the phosphoric acid slurries. Settling rate is measured next. After settling for 10 minutes, the supernatant acid is collected for turbidity measurement according to the methods discussed in Example 16. Results are shown in Table 9.

TABLE 9

| Sample | Dosage (ppm) | Settling Rate (m/h) | Turbidity of supernatant acid after settling for 10 minutes (NTU) |
|---|---|---|---|
| Polymer A | 20 | 1.02 | 459 |
| Control (with flocculant used at plant and currently available in the marketplace-unknown brand) | 20 | 0.87 | >1000 |

The results indicate that there is a correlation between the composition and crosslinker ratio of polymer product and the capability of clarifying phosphoric acid. Polymeric microparticles containing a certain percentage of carboxylic acid functional groups and a certain amount of crosslinkers are more effective at clarifying phosphoric acid than either control samples or polymer samples with a linear structure.

Thus, taken together, these results indicate that various polymeric microparticles can be highly effective reagents useful for improving the filtration rate of phosphoric acid and/or clarifying phosphoric acid from wet process phosphoric acid production, and that such polymeric microparticles of a threshold amount of acrylic acid (i.e., carboxylic acid functional group) and a threshold amount of a crosslinkers can be said to be one of the key components for capability of filtration rate enhancement and/or clarification for phosphoric acid generated by the wet process.

Various patent and/or scientific literature references have been referred to throughout this application. The disclosures of these publications in their entireties are hereby incorporated by reference as if written herein. In view of the above description and the examples, one of ordinary skill in the art will be able to practice the invention as claimed without undue experimentation.

Although the foregoing description has shown, described, and pointed out the fundamental novel features of certain embodiments of the present invention, it will be understood that various omissions, substitutions, and changes in the form of the detail of the invention as described may be made by those skilled in the art, without departing from the scope of the present teachings. Consequently, the scope of the present invention should not be limited to the foregoing description or discussion, but should be defined by the appended claims.

I claim:

1. A method for enhancing the filtration rate of phosphoric acid produced by the wet process and containing suspended insoluble precipitates, the method comprising:
   adding to the phosphoric acid at any stage of the phosphoric acid production process an effective amount of a reagent comprising polymeric microparticles crosslinked by a polyfunctional crosslinking agent selected from the group consisting of N,N'-methylenebisacrylamide; N,N'-methylenebismethacrylamide; polyethyleneglycol diacrylate; polyethyleneglycol dimethacrylate; N-vinyl acrylamide; triallylammonium salts; N-methylallylacrylamide; methylolacrylamide; glycidyl acrylate; divinylbenzene; acrolein; gyloxal; diepoxy compounds; epichlorohydrin; and mixtures thereof, wherein the polyfunctional crosslinking agent has a molar ratio from 90 molar parts per million to 5,000 molar parts per million based on the total mole % of monomers present in the polymeric microparticle, and wherein said microparticles are characterized as being anionic or amphoteric and have a weight average molecular weight of greater than 60 Million Da; and filtering the phosphoric acid, thereby enhancing the filtration rate of the phosphoric acid.

2. A method according to claim 1, wherein the polymeric microparticles comprise at least one anionic monomer having a carboxylic functional group and selected from the group consisting of acrylic acid; methacrylic acid; ethacrylic acid; maleic acid; acrylate; and methacrylate.

3. A method according to claim 1, wherein the polymeric microparticles are amphoteric and comprise from 1 mole % to 99 mole % of an anionic monomer and from 99 mole % to 1 mole % of a cationic monomer.

4. A method according to claim 3, wherein the cationic monomer is selected from the group consisting of acryloxyethyltrimethylammonium chloride; diallydimethylammonium chloride; 3-(meth)acrylamidopropyltrimethylammonium chloride; 3-acrylamidopropyltrimethylammonium-2-hydroxypropylacrylate methosulfate; trimethylammoniumethyl methacrylate methosulfate; 1-trimethylammonium-2-hydroxypropylmethacrylate methosulfate; ethacryloxyethyltrimethylammonium chloride; any of the preceding compounds with salts of other anions; and mixtures thereof.

5. A method according to claim 1, wherein the polymeric microparticles comprise at least one ethylenically unsaturated non-ionic monomer.

6. A method according to claim 5, wherein the non-ionic monomer is selected from the group consisting of acrylamide; methacrylamide; N,N-dialkylacrylamides; N-alkylacrylamides; N-vinylmethacetamide; N-vinylmethylformamide; N-vinyl pyrrolidone; and mixtures thereof.

7. A method according to claim 5, wherein the polymeric microparticles comprise acrylic acid and acrylamide monomers.

8. A method according to claim 2, wherein the at least one anionic monomer is present from 3 mole % to 100 mole %, based on the total mole % of monomeric units in the polymeric microparticles.

9. A method according to claim 2, wherein the at least one anionic monomer is present from 30 mole % to 99 mole %, based on the total mole % of monomeric units in the polymeric microparticles.

10. A method according to claim 9, wherein the at least one anionic monomer is present from 40 mole % to 90 mole %, based on the total mole % of monomeric units in the polymeric microparticles.

11. A method according to claim 10, wherein the molar ratio of acrylic acid monomers to acrylamide monomers is 60 mole % to 40 mole %.

12. A method according to claim 7, wherein the polymeric microparticles further comprise 2-acrylamido-2-methyl-1-propanesulfonate.

13. A method according to claim 1, wherein the polyfunctional crosslinking agent comprises N,N'-methylenebisacrylamide.

14. A method according to claim 1, wherein the polyfunctional crosslinking agent has a molar ratio from 90 molar parts per million to 2,000 molar parts per million based on the total mole % of monomers present in the polymeric microparticle.

15. A method according to claim 1, wherein the weight average molecular weight of said polymeric microparticles is up to and including $1.5 \times 10^8$ million Daltons.

16. A method according to claim 15, wherein the weight average molecular weight of said polymeric microparticles is from 100 million Daltons to 2,500 million Daltons.

17. A method according to claim 1, wherein the solution viscosity is from 1.1 mPa·s to 2.1 mPa·s.

18. A method according to claim 1, wherein the polymeric microparticles are added at one or more of the filter stage, clarifying stage, concentrating stage, or evaporation stage.

19. A method according to claim 1, wherein the polymeric microparticles are added in an amount from 0.1 g/ton, et seq., to 5,000 g/ton of phosphoric acid.

* * * * *